Dec. 12, 1950 F. D. BRADDON 2,533,217
GYROVERTICAL SLAVING SYSTEM
Filed Nov. 29, 1946 3 Sheets-Sheet 1
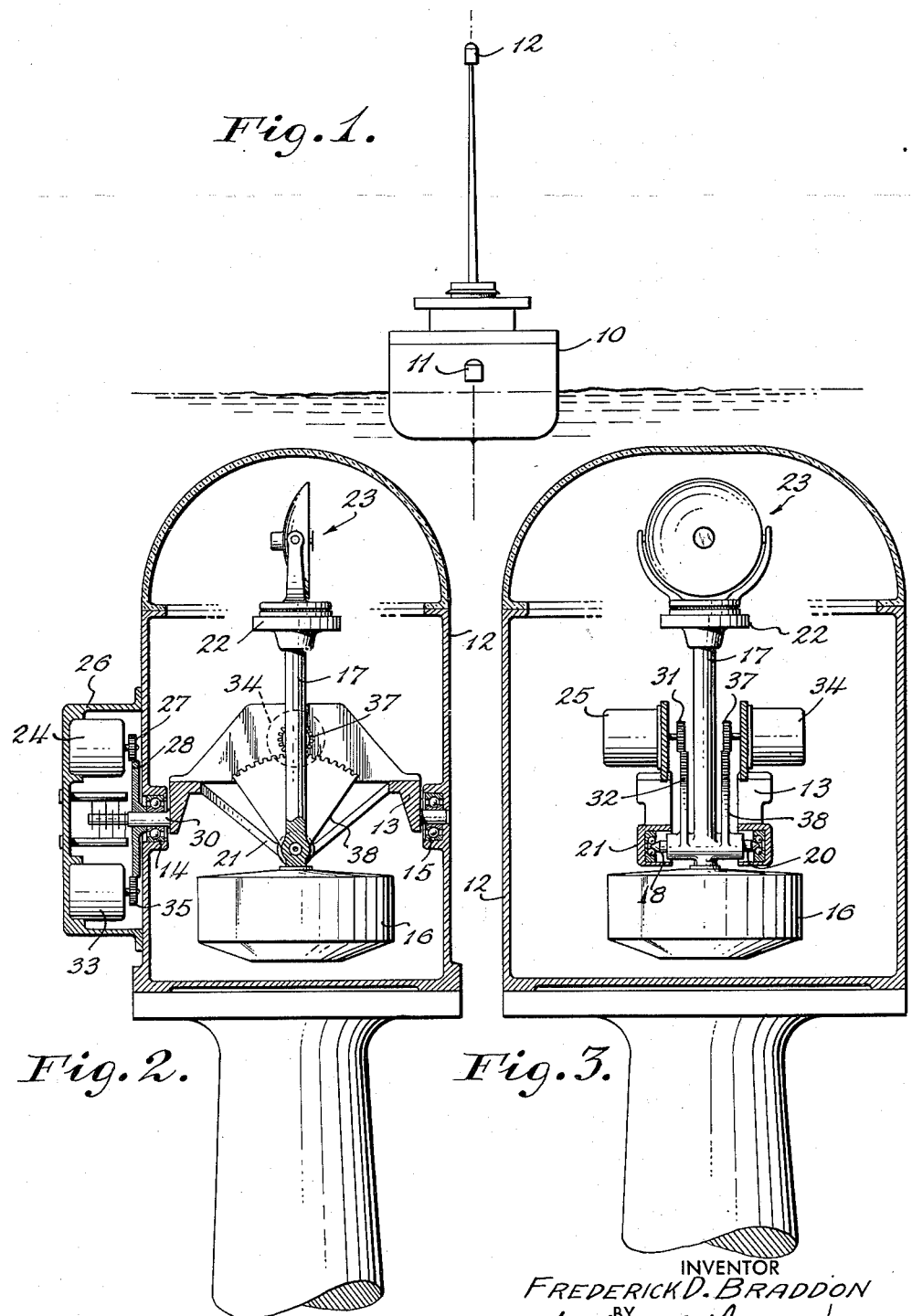
INVENTOR
FREDERICK D. BRADDON
BY
his ATTORNEY Dec. 12, 1950 F. D. BRADDON 2,533,217
GYROVERTICAL SLAVING SYSTEM
Filed Nov. 29, 1946 3 Sheets-Sheet 2

INVENTOR
FREDERICK D. BRADDON
BY
ATTORNEY.

UNITED STATES PATENT OFFICE 2,533,217

GYROVERTICAL SLAVING SYSTEM

Frederick D. Braddon, Babylon, N. Y., assignor to The Sperry Corporation, a corporation of Delaware Application November 29, 1946, Serial No. 713,189

20 Claims. (Cl. 114—191)

On account of the rolling and pitching of ships, it is highly desirable to stabilize such instruments thereon as sights, guns, radio scanners, direction finders, etc. For such purpose, gyro verticals are usually employed which essentially are gyroscopes slaved to gravity in some manner, preferably through a power erection device acting at right angles to the gravitational controller usually placed on the gyroscope. Such a problem becomes extremely difficult when the object to be stabilized is on the mast or upper bridge of a ship high above the deck. Attempts to stabilize objects in this position by a gyro vertical on the mast have not proved very successful for at least two reasons. One, the extremely violent accelerations to which the gyro is subjected in this position acting on the gravitational factor, cause errors in the gyroscope, especially in a rough sea, on a ship such as a destroyer in which the period of roll and pitch is quite short. Two, the mast is usually subject to temporary bending, so that the platform on the mast does not remain parallel to the ship's deck. A good gyro vertical may define a level condition to an accurate degree for example $\frac{1}{10}$ degree. However, if the mast is deflected, for example, three degrees due to rolling or pitching motion of the ship, the stabilized object or device thereon cannot be controlled to greater accuracy than three degrees.

To overcome these difficulties, it has been proposed to stabilize the object such as a radio scanner on the mast from a gyro vertical located on the ship's deck or preferably at the metacenter of the ship by means of an interconnecting servo system. Such a solution has proved unsatisfactory because the aforesaid variation that takes place during rolling and pitching between a normally horizontal platform on the mast and the ship's deck.

According to my invention, I propose to overcome both the above-mentioned difficulties by mounting a gyroscope without its gravitational contro's on the mast adjacent or supporting the object to be stabilized. On the other hand, the gravitational controllers or pendulums for the gyroscope are placed near the metacenter of the ship where the acceleration forces are a minimum. I then control torquers on the gyroscope from such pendulums by mounting the pendulums on a platform which is maintained in the same relative position with respect to its datum (the ship's deck) that the gyroscope is maintained with respect to its datum (the mast). Hence, while the pendulums are at the metacenter of the ship their reference platform, from which signals are generated, is tilted with the mast thereby giving the gyroscope the correct torques for maintaining it truly vertical.

By my invention, I also reduce the turn error in the gyro-vertical by greatly reducing the disturbing torques reaching the gyro from the gravitational controllers during turns. This I accomplish by mounting the control pendulums at the metacenter of the ship on a compass stabilized platform, which, therefore, does not turn in azimuth and by heavily damping the pendulums. In the ordinary gyro-vertical, the pendulous controller which pivots about the fore-and-aft axis of the ship is continuously affected during a turn of the ship so that a continuous spurious torque is transmitted to the gyro as long as a turn in one direction continues. According to my invention, however, by stabilizing the pendulums in azimuth, one pendulum is not continuously affected but the effect is gradually alternately transferred from one to the other during a 360° turn. By heavily damping such pendulums, the disturbing effect of the turn is greatly reduced, since the duration of the centrifugal force on each pendulum is reduced. Therefore, by heavily damping the pendulums, I prevent them from being seriously disturbed during such short time interva's. For a like reason, the damping reduces spurious movements of the pendulums due to short period rolling and pitching of the ship, coupled with the fact that the pendulums are mounted on a stabilized platform.

One of the features of the invention therefore resides in the provision of a slaving system of this character in which the gyro vertical is situated at a remote point from the metacenter of the ship and the gravity reference for the same is situated at the metacenter of the ship.

Another feature of the invention resides in the inclusion in the repeat-back means of the slaving system of the pick-offs at the gyro vertical.

Another feature of the invention is the provision of heavy damping means for the pendulous controllers, together with means for stabilizing the base on which they are mounted in azimuth.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other objects, features and structural details of the invention will be apparent from the following description when read in relation to the accompanying drawings, wherein Fig. 1 is a schematic end elevation showing the location of the gravity reference unit of the slaving system at the metacenter of a ship and the position of the gyro vertical of the system on the mast of the ship;

Fig. 2 is an enlarged elevation view, partly in section, of the gyro vertical instrument of the improved system;

Fig. 3 is an elevation view of the gyro vertical taken at right angles to the showing thereof in Fig. 2;

Figure 4:
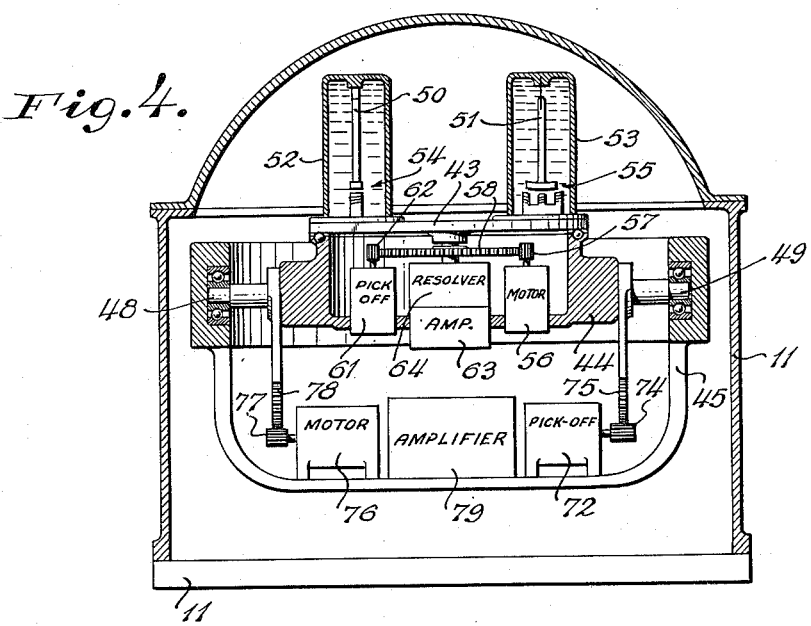
Fig. 4 is an enlarged elevation view, partly in section, of the gravity reference unit of the improved system.

With reference to Fig. 1, the improved system is shown adapted for use on a ship 10. The gravity reference provided by the system includes a housing 11 that is substantially situated at the metacenter of the ship in order to keep the sensitive elements of the reference as free as possible from rolling or pitching accelerations of the ship. The gyro vertical of the system is indicated in this figure by its casing 12. As shown, the casing 12 of the gyro vertical is situated at a remote point from the meta center of the ship and in this instance is located on the mast of the ship. It will be understood that the gyro vertical can be mounted at other points than on the mast as long as this point is remote or distant from the metacenter of the ship.

With particular reference to Figs. 2 and 3, the gyro vertical of the improved system is shown to include a gimbal ring 13 pivotally mounted in bearings 14—15 in the casing 12 to provide the major axis of universal support for rotor case or frame 16. Frame 16 includes a rotor (not shown) that is suitably spun about a substantially vertical axis. In the construction shown, the case 16 is pivotally mounted on the ring 13 for movement about a minor axis that is below its major axis in the casing. The mounting provided includes a post 17 that extends vertically from the top of the case or frame 16 and includes a pivot means in the form of trunnions 18 and 20 that engage bearings in ring 13 situated below the bearings 14—15 in the casing 12. The ring 13 in the form of gyro vertical shown in Figs. 2 and 3, is shaped to provide an underslung portion 21 in which the engaging surfaces for the trunnions 18 and 20 are located. The provided mounting supports the rotor frame 16 below the gimbal ring 13 to pivot about a minor axis that is normally perpendicular to a vertical plane that includes the axis of the ring defined by bearings 14, 15.

The described gyro vertical is particularly adapted for use in stabilizing an object or device that is mounted on the rotor case thereof. In this connection, the instrument includes a platform 22 at the top of post 17 on which an object or device, such as a radiant energy scanning device, indicated generally at 23, is located. As shown, the scanner may include a yoke that is mounted to move about a vertical axis on the platform. It is desired to point out that the present invention is not concerned with the type of object or device that is stabilized or the manner in which the same is mounted on the platform. However, the described mounting provisions for the frame or case are such as to counterbalance the weight of the post, platform and stabilized object or device so that the frame or case as a unit is universally supported in neutral equilibrium in the casing. The axes on which the rotor case is universally supported in the casing are mutually perpendicular and substantially horizontal. The gyro vertical per se is described and claimed in applicant's U. S. Patent No. 2,477,574 of August 2, 1949.

A two-part pick-off 24 at the gyro vertical provides a signal with relative tilt of the rotor case about its major axis relative to the mast head. A similar pick-off generally indicated at 25 likewise detects relative tilts of the rotor case about its minor axis. As shown, the pick-offs 24 and 25 may be electrical transmitters or signal generators of the Selsyn type provided with wound stator and rotor parts.

Figure 6:
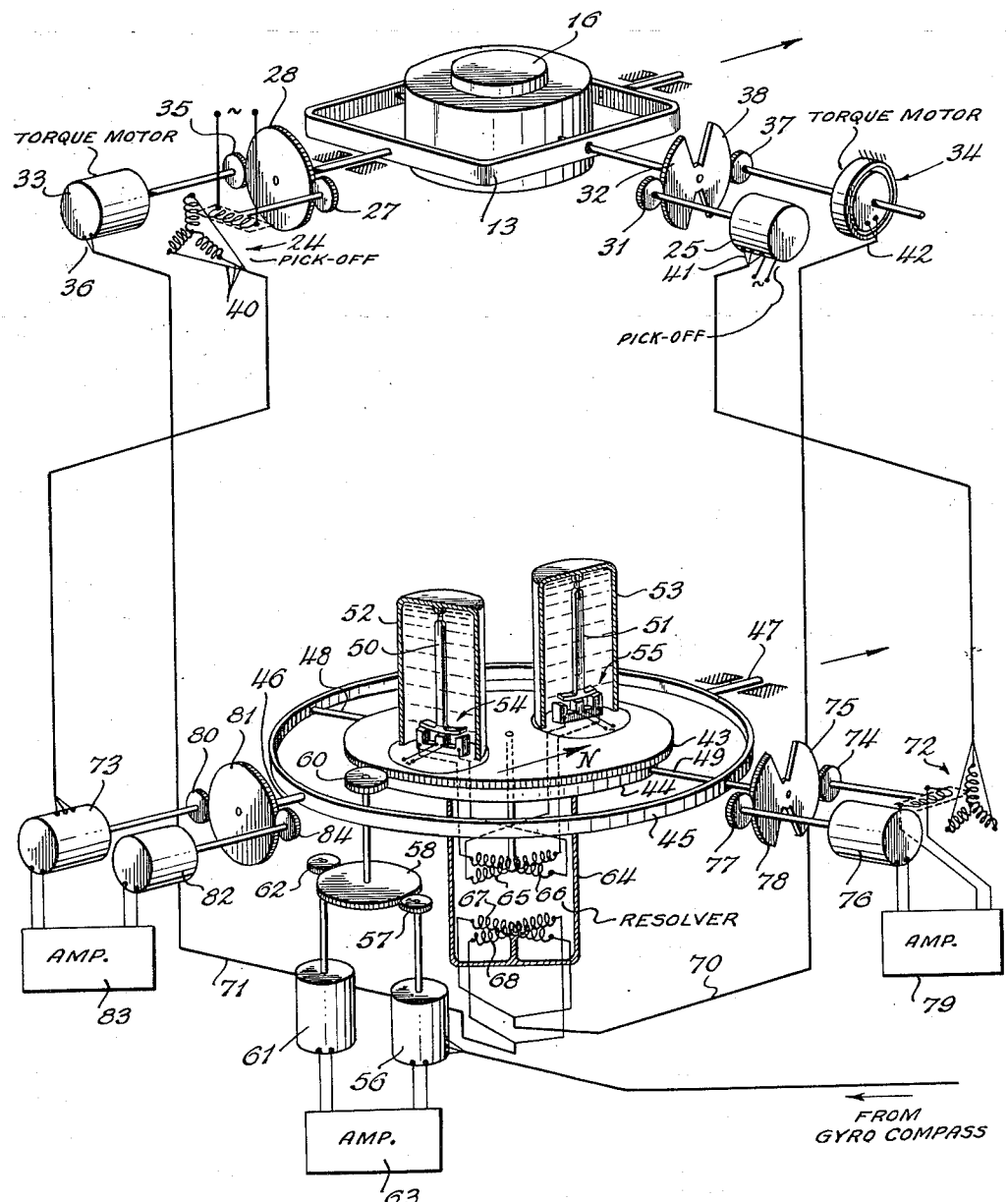
Fig. 6 is a combined schematic view and circuit diagram of a slaving system embodying the present inventive concepts.

As shown in Figs. 2 and 6, the stator of pick-off 24 is fixedly mounted on a cover plate 26 that is secured in a suitable manner (not shown) to the casing 12. The rotor of the pick-off 24 provides a movable part (Fig. 6) with a gear 27 connected thereto that meshes with a gear 28 mounted on the ring 13 with its axis coincident with the axis of the ring. Specifically, gear 28 is mounted on the axis defining trunnion 30 of ring 13.

The stator of pick-off 25 is mounted on the gimbal ring 13. The rotor or movable part of this pick-off has a gear 31 connected thereto that meshes with a gear sector 32 fixed to the pivotal mounting at the top of the case or frame 16. Sector 32 is arranged on the mounting so that its axis is coincident with the minor axis of the frame or case.

Figure 5:
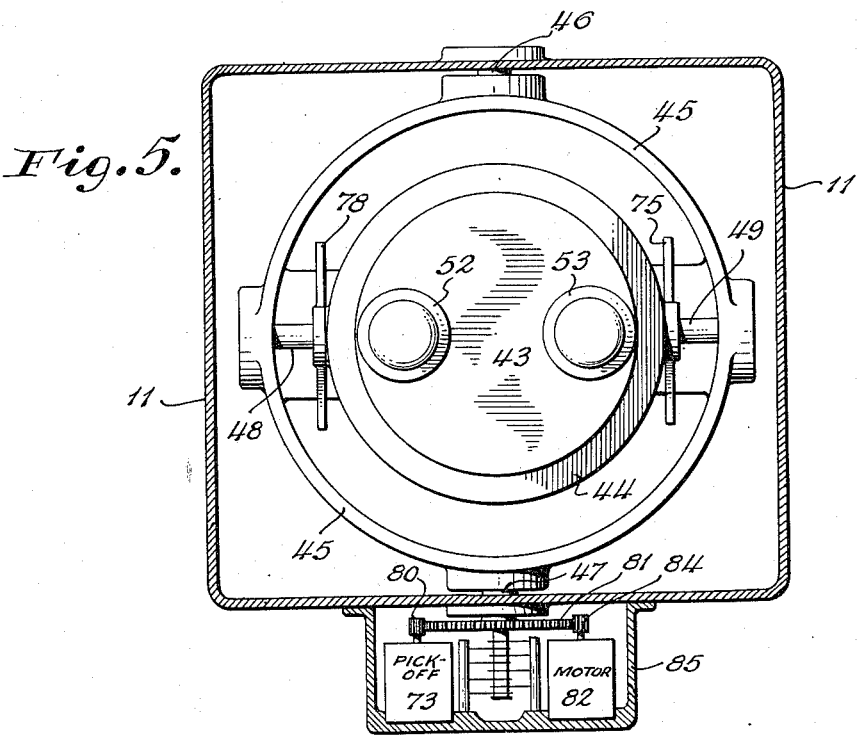
Fig. 5 is a plan view of the reference unit shown in Fig. 4.

The gyro instrument further includes erecting means in the form of a pair of torque motors 33 and 34, the first of which is effective about the major axis of frame 16 and the other of which is effective about the minor axis of the frame. Motors 33 and 34 may have a construction similar to that of a two-phase induction motor with a squirrel cage rotor, such as shown in Fig. 5 of U. S. Patent No. 2,392,370 to Esval et al. The squirrel cage of this motor, as shown by motor 34 (Fig. 6), may form the stator part thereof and the provided winding may be formed on part of the rotor. As shown in Fig. 6, the rotor of motor 33 has a gear 35 connected thereto that meshes with gear 28 of the instrument. The stator part of motor 33 is fixedly mounted in the cover plate 26 in a suitable manner (not shown). The input leads to torque motor 33 are indicated at 36. Motor 34 includes a stator part that is fixedly mounted on the ring 13 in the position shown in Fig. 3. The rotor of motor 34 has a gear 37 connected thereto that meshes with a gear sector 38 fixedly connected to the mounting at the top of the rotor case or frame 16. Elements 32 and 38 provide a pair of coaxial gear sectors fixed to the mounting at the top of the frame having an axis coincident with the minor axis of the frame. Gear sectors 32 and 38 extend vertically from the mounting on opposite sides of the post 17 of the gyro vertical. It will be understood that motor 33 when effective exerts a torque about the axis of the instrument defined by bearings 14, 15 by way of the meshed gears 35 and 28. Motor 34 operates to exert a torque about the axis of the instrument defined by trunnions 18 and 20 by way of the gear 37 and the gear sector 38 meshed therewith. Also, with tilt of the frame from a null position about its major axis, gear 28 actuates the movable element of pick-off 24 through gear 27 so that an output signal is produced. The output leads of pick-off 24 are indicated at 40. With tilt from a null position of frame 16 about the minor axis of the instrument, gear sector 32 actuates the movable element of pick-off 25 through gear 31 to provide an output. The output leads of pick-off 25 are indicated at 41. The input leads to torque motor 34 are indicated at 42. In Fig. 6 of the drawing, the gyro vertical instrument is represented schematically in order to prevent undue complication in illustrating the improved slaving system.

The gravity reference situated at the metacenter of the ship is shown in detail in Figs. 4 and 5. This view of the system, as shown, may include a table having 360° of freedom in azimuth that is pivotally supported on a universal mounting with a frame 44 and a gimbal ring 45. Ring 45 may be pivotally mounted in the housing 11 for movement about an axis defined by trunnion 46, 47 that may parallel the fore and aft axis of the craft. The frame 44 of the universal mounting is pivotally mounted on the ring for movement about an axis defined by trunnions 48, 49 that may parallel the athwartship axis of the craft. The mounting for the gravity reference located on table 43 is movable about two mutually perpendicular, substantially horizontal axes. The reference, per se, may be provided by a pair of sensitive elements in the form of pendulums 50, 51 arranged to be responsive to tilt in vertical planes at right angles to one another. As shown, the pendulums are situated in individual containers 52 and 53 suitably mounted on the top of table 43. Preferably each pendulum is heavily damped for the purpose of reducing spurious torques that would otherwise be transmitted to the gyro due to short period accelerations of the ship acting on the pendulums. Damping may readily be accomplished by filling the containers 52, 53 for the pendulums with a suitable viscous liquid which does not change its viscosity appreciably with temperature changes. Each of the pendulums 50, 51 includes the armature of an E-type pick-off respectively indicated at 54 and 55 of the character shown and described in U. S. Patent 1,959,804 to Wittkuhns et al. The stator of pick-offs 54 and 55 has a central primary winding and series-opposed secondary windings. Electrical energy is supplied the primary winding. The secondary provides an output signal depending in phase and magnitude on the direction and extent of angular displacement between the armature and stator parts. The stators of the respective pick-offs 54 and 55 may be formed as a part of the base of the individual containers 52 and 53.

As a further means for reducing spurious acceleration forces from being transmitted to the gyroscope, I prefer to stabilize the pendulums also in azimuth. In other words, I mount the pendulums on a platform which is oriented from a master compass, such as a gyro compass, so that their pivotal axes do not turn with the ship. As shown in Figs. 4 and 6, the table 43 on which the pendulums are mounted is rotatably mounted on the gimbal support 44. The table is shown as oriented from a power motor 61 connected through pinion 62 and gear train 58, 60 to teeth on the periphery of the table 43. The power motor is controlled from the output of a means such as a Selsyn signal generator 56 through amplifier 63, Selsyn 56, in turn, being connected to a Selsyn transmitter (not shown) on a gyro compass. Any disagreement in position between table 43 and the gyro compass will cause a signal to be imparted from Selsyn signal generator 56 to drive the motor 61 in the proper direction to erase the error, the table 43, therefore, being maintained fixed in azimuth as are repeater compass cards of a gyro compass.

Assuming the table to be oriented in azimuth with the arrow pointing north, the pendulum 51, will generate signals upon relative tilt of the pendulum and its pick-off about an east-west axis, and the pendulum 50 will generate signals upon relative tilt about a north-south axis. These axes will remain fixed during any change in heading of the ship.

In the ordinary gyro vertical, on the other hand, the pendulum which is pivoted about the fore-and-aft axis of the ship and is continuously affected when the ship turns, so that a long-continued signal is generated disturbing the gyroscope during a continued turn of a ship. In my system, on the other hand, the torque during such circumstances is not continuous in either amount or sign on one of the pendulums, but is constantly shifting from one to the other as the ship turns in accordance with a sine-cosine function of the angle between the heading and north. Therefore, both the duration and integrated amount of disturbing force on the pendulum is reduced and this effect is further minimized by the heavy damping of the pendulum which prevents such short period acceleration forces from materially affecting the pendulum. As shown in Fig. 4, motor 61 and Selsyn generator or pick-off 56 and the parts connected thereto are situated on the frame 44 of the mounting unit for the gravity reference. It will be understood that table 43 normally lies in a horizontal plane and that tilt out of such plane produces an output from one or both of the pick-offs 54 and 55.

The signals that are generated by such pendulums cannot be fed to the gyro directly however, since the trunnions of the gyroscope are turned with the ship and not stabilized in azimuth. It is, therefore, necessary to provide a torque resolving means for feeding the signals from the pendulums to the gyroscope. As shown in Fig. 6, resolver 64 is a variable transformer having two primary windings 65 and 66, respectively, energized by the output of pick-offs 54 and 55. Primary windings 65 and 66 arranged in quadrature positional relation for freedom from mutual coupling are mounted as shown for movement with table 43. The secondary windings 67, 68 of the resolver are similarly arranged in quadrature positional relation and are fixed to the housing of the resolver which is mounted in frame 44, Fig. 4 of the mounting for the gravity reference. The primary windings of the resolver are consequently stabilized in azimuth while the secondary windings change position relative thereto with change in heading of the craft. For the heading shown in Fig. 6, the output of secondary winding 68 is fed to torque motor 33 by way of lead 71. The output of secondary winding 67 is fed to torque motor 34 by way of lead 70. Pendulums 50, 51 define the vertical reference to which the remotely located gyro vertical is slaved through its torque motors 33 and 34. With tilt of the table for any reason relative to the reference, one or both of the pick-offs 54, 55 provide an output signal that is fed through the resolver to one or both of the torque motors 33 and 34 to precess the rotor frame 16 and cause the same to follow the table 43. Such resolvers 64 are commercially available.

Referring now to Figs. 4–6, the gravity reference instrument is shown as maintained parallel to the mast head mounting for the gyro by a Selsyn follow-back system between these instruments which includes the above-described Selsyn pick-offs or transmitters 24 and 25 and complementary Selsyn signal generators 73 and 72. The polyphase windings of the members of each pair are cross connected through leads 40 and 41 so that an output is secured from the respective single phase armature of the generators 73 or 72 as the case may be, upon relative tilt of the gyro and mast head as compared to the ship's deck and gravity reference platform 43. In other words, an output is produced in this manner whenever either tilt of the gyro or mast head occurs with respect to the plane of the ship's deck, although outputs from the latter cause have a negligible overall effect as hereinafter explained. This is accomplished by connecting the output of the single phase rotors of generators 73 and 72 through amplifiers 83 and 79 respectively to power motors 82 and 76 which rotate or position the platform in its gimbals about major fore-and-aft axis 46 and 47 and minor transverse axis 48, 49. The motor 82 is shown as geared to the trunnion 46 through gearing 84 and 81, the generator 73 being connected through pinion 80 to the same gear 81. Similarly, motor 76 turns the minor trunnion 49 through gear 78 to which is also geared the shaft of the rotor 72 through pinion 74.

Hence, the motors 76 and 82 provide a means for maintaining the reference platform 43 horizontal from the gyro 16 but subject to an error whenever the mast head is temporarily deflected from the plane of the ship's deck during rolling and pitching, because such motors are controlled from a self-synchronous transmission system which includes the transmitters 24, 25 and the signal generators 73 and 72. Therefore, any tilt from the vertical of the gyroscope will be reproduced in platform 43 and detected by the pendulums 50 and 51 just as would be the case if the pendulums were actually mounted on the gyroscope. The proper correcting torque will therefore be imparted to the gyro from the torque motors 33 or 34 as controlled from the pendulums 50, 51 through the resolver 64. While, as stated, temporary torques would also be applied to the gyro during the time that the ship's mast is temporarily deflected from its normal plane with respect to the plane of the ship's deck in rolling and pitching of the ship, due to tilting of platform 43 at that time, such temporary torques would not cause serious disturbances of the gyro or deflection of the scanner 23 mounted thereon because of the slow integrating effect of the gyro. In other words, the torque motors exert only a weak torque on the gyro giving it a slow precession rate and the resulting precession of the gyro would be inconsequential and averaged out by the reversing inclination of the mast as the ship rolls and pitches.

Since many changes could be made in the above construction and many apparently widely difference embodiments of this invention could be made without departing from the scope thereof, it is intended that all matter contained in the above description or shown in the accompanying drawings shall be interpreted as illustrative and not in a limiting sense.

What is claimed is:

1. In a system in which a gyro vertical is slaved to a remotely located gravity reference, the combination of a gyro vertical with a universally mounted rotor frame, a gravity reference with a sensitive element, a universal mounting for said reference, a data transmission system including a pair of two part signal generators, and a motor operated by the output of said transmission system operatively connected to the mounting for the reference, one of said signal generators having a part operatively connected to the frame of said gyro vertical and the other of said signal generators having a part operatively connected to the mounting for the reference.

2. In a system in which a gyro vertical is slaved to a remotely located gravity reference, the combination of a gyro vertical with a universally mounted rotor frame, a gravity reference with a sensitive element, a universal mounting for said reference, a first electrical signal generator having a stator and rotor, said rotor being operatively connected to the rotor frame of said gyro vertical, a second electrical signal generator having a stator and rotor, said rotor being operatively connected to the mounting for the reference, a data transmission system connecting said first and second generators, and a motor operatively connected to said mounting for the reference responsive to the output of said transmission system.

3. A system as claimed in claim 2, in which the stators of the first and second signal generators are interconnected, the rotor of one of said signal generators is connected to a source of electrical energy, and the rotor of the other generator provides the output of the data transmission system.

4. In a system in which a gyro vertical is slaved to a remotely located gravity reference, the combination of a gyro vertical with a rotor case mounted for freedom about two mutually perpendicular, substantially horizontal axes, a gravity reference with a sensitive element, a mounting for said reference providing freedom about two mutually perpendicular, substantially horizontal axes, a first pick-off for detecting relative tilt of the rotor case and its mount, a second pick-off for detecting relative tilt of said reference and its mount, and a data transmission system including said first and second pick-offs providing an output, and means connected to move the reference about said last-named tilt axis responsive to the output of said transmission system.

5. A system as claimed in claim 4 including a third pick-off for detecting relative tilt of the rotor case and its mount, a fourth pick-off for detecting relative tilt of said reference and its mount, and a second data transmission system including said third and fourth pick-offs providing an output, and means connected to move the mounting about said last-named tilt axis responsive to the output of said second transmission system.

6. In a system in which a gyro vertical is slaved to a remotely located gravity reference, the combination of a gyro vertical with a rotor case adapted to be mounted on the ship's mast for freedom about two mutually perpendicular, substantially horizontal axes, a gravity reference with a sensitive element, a mounting for said reference providing freedom about two mutually perpendicular, substantially horizontal axes, a first two part pick-off having one of its parts operatively connected to the rotor case to move with tilt of the case about one of its axes with respect to said mast, a second two part pick-off having one of its parts operatively connected to the mounting for the reference to move with tilt of the mounting about one of its axes with respect to the ship's deck, and a follow-up motor operable from the output of said pick-offs.

7. A system as claimed in claim 6, including a third two part pick-off having one of its parts operatively connected to the rotor case to move with tilt of the case about the other of its axes, a fourth two part pick-off having one of its parts operatively connected to the mounting for the reference to move with tilt of the mounting about the other of its axes, and means connecting the other of the parts of said third and fourth pick-offs.

8. The combination of a gyro vertical having erecting means and a rotor case supported for movement about two mutually perpendicular, substantially horizontal axes, a gravity reference with one or more sensitive elements situated remotely relative to said gyro vertical, slaving means connecting the erecting means of the gyro vertical and said gravity reference, a mounting universally supporting said reference having two mutually perpendicular, normally horizontal axes, and repeat-back means including a pick-off at each of the axes of the rotor case and each of the axes of said mounting, a first motor connected to move said mounting about one of its axes operated by the output of one pair of pick-offs, and a second motor connected to move said mounting about the other of its axes operated by the output of the other pair of the pick-offs.

9. The combination claimed in claim 8 in which the sensitive elements of the gravity reference are a pair of pendulums and means for stabilizing said reference in azimuth.

10. The combination claimed in claim 9 in which the gravity reference is stabilized in azimuth, and said slaving means includes a pick-off at each pendulum and an azimuth component resolver for the outputs of said pick-offs.

11. The combination of a gravity reference having one or more sensitive elements substantially situated at the metacenter of a ship, a gyro vertical situated at a remote point from the metacenter of the ship, slaving means connecting said gravity reference and said gyro vertical and means for compensating for any relative tilt of the ship's metacenter and said remote point.

12. The combination of a gravity reference having a sensitive element substantially situated at the metacenter of a ship, a gyro vertical situated on the mast of the ship, slaving means connecting said sensitive element and said gyro vertical and means for compensating for the relative tilt of the ship's metacenter and mast head.

13. An improvement in gravitational controllers for gyro verticals for ships, comprising a pivotally mounted platform on which said controllers are mounted for sensitivity to tilt about two horizontal axes normal to one another; means for stabilizing said platform from said gyro, means for maintaining said platform fixed in azimuth during turning of the ship, means for heavily damping both controllers, torque means for applying erecting torques to the gyro about both horizontal axes and tilt responsive pick-off means between the pendulums and platform controlling such torque means.

14. An improvement in gravitational controllers as claimed in claim 13, in which said platform is remote from but stabilized from the relative position of said gyro vertical and its mount.

15. An improvement in gravitational controllers as claimed in claim 13 having a resolving means between said pick-offs and said torque means to apportion the torques with respect to the fore and aft and athwartship axes of the ship.

16. The combination with a pair of pendulums pivoted about axes normal to one another on a mounting adapted to be located near the metacenter of the ship, means for orienting said mounting on the ship from a compass, means for heavily damping said pendulums, a gyro vertical situated on the mast of a ship, follow-back means connecting said mounting and the gyro vertical to maintain the mounting parallel to a normally horizontal plane on the mast, pick-offs acting between the pendulums and their mounting and torque means on the gyro for maintaining it vertical controlled from said pick-offs.

17. As a means for reducing turn errors in a craft's gyro vertical having power operated torquers for erecting the same about the craft's fore-and-aft and transverse axes, a pair of gravitationally responsive controllers generating signals for said torquers responsive to tilt about axes normal to one another, said gyro vertical being situated at a point on the craft remote from the gravitationally responsive controllers and said controllers being situated at the metacenter of the craft, a rotatable mounting for said gravitationally responsive controllers, means for orienting said mounting from a compass as the craft turns, and resolving means for apportioning the signals to said torquers in accordance with the craft's heading.

18. A means for reducing turn errors in a craft's gyro vertical having power operated torquers for erecting the same about the craft's fore-and-aft and transverse axes, a pair of damped pendulums pivotally mounted about horizontal axes normally to one another, a rotatable mount on which said pendulums are pivoted, pick-off means for each pendulum generating a signal responsive to tilt of the pendulum about its pivotal axis, means for orienting said mount from a compass as the craft turns, and resolving means for apportioning the signals to said torquers in accordance with the craft's heading.

19. In a system in which a gyro vertical is slaved to a remotely located gravity reference, the combination of, a gyro vertical having freedom about a horizontal axis, a gravity reference, a mounting for said reference having freedom about a horizontal axis parallel to the axis of the gyro vertical, a pick-off for detecting tilt of the mounting about its axis, a second pick-off for detecting tilt of the gyro vertical about its axis, and motive means operatively connected to said mounting responsive to disagreement between the position of said pick-offs.

20. The combination of a gyro vertical having freedom about a horizontal axis positioned on a ship's mast head, a gravity reference situated at the ship's metacenter, a mounting for said reference having freedom about a horizontal axis parallel to the axis of the gyro vertical, a pick-off for detecting relative tilt of the ship and the mounting about its axis, a second pick-off for detecting relative tilt of the ship's mast head and gyro vertical about its axis, and motive means operatively connected to tilt said mounting responsive to the differential output of said pick-offs.

FREDERICK D. BRADDON.

REFERENCES CITED

The following references are of record in the file of this patent:

UNITED STATES PATENTS

| Number | Name | Date |
|---|---|---|
| 2,188,606 | Koster | Jan. 30, 1940 |
| 2,270,875 | Hanson et al. | Jan. 27, 1942 |
| 2,405,058 | Ross | July 30, 1946 |
| 2,411,087 | Ford et al. | Nov. 12, 1946 |